United States Patent [19]
Brownfield

[11] Patent Number: 5,355,692
[45] Date of Patent: Oct. 18, 1994

[54] PHASE CHANGE LOCATION CONTROLLER FOR A HEAT EXCHANGER IN A REFRIGERATION SYSTEM

[75] Inventor: Jerry A. Brownfield, Minneapolis, Minn.

[73] Assignee: Thermo King Corporation, Minneapolis, Minn.

[21] Appl. No.: 114,405

[22] Filed: Sep. 1, 1993

[51] Int. Cl.$^5$ .............................................. F25B 41/00
[52] U.S. Cl. ................................... 62/212; 236/91 G; 374/148
[58] Field of Search ................ 62/225, 212; 236/91 F, 236/91 G; 374/148

[56] References Cited

U.S. PATENT DOCUMENTS

| | | | |
|---|---|---|---|
| 3,070,974 | 1/1963 | Greenwald | 62/197 |
| 3,577,743 | 5/1971 | Long | 62/212 |
| 3,698,204 | 10/1972 | Schlotterbeck et al. | 62/206 |
| 4,523,435 | 6/1985 | Lord | 62/212 |

OTHER PUBLICATIONS

Page 11 of Fenwal Electronics "Capsule Thermistor Course Booklet" 10M-9-178-MBP.

*Primary Examiner*—William E. Wayner

[57] ABSTRACT

A refrigeration system, and method of operating same, with the refrigeration system having a refrigerant flow path which includes a heat exchanger having an inlet, an outlet, and a refrigerant flow path between the inlet and outlet. The refrigerant enters the inlet in a first predetermined phase and exits the outlet in a second predetermined phase. A first resistance device is disposed in heat exchange relation with the refrigerant in the flow path of the heat exchanger, adjacent to the inlet. A second resistance device is disposed in heat exchange relation with the refrigerant in the flow path of the heat exchanger, at a location between the inlet and outlet where the change in phase from the first phase to the second phase is desired. The first and second resistance devices are connected in a bridge circuit having bridge arms connected between input and output terminals, with a source of potential being connected to the input terminals. The output terminals of the bridge circuit are connected to a controller, with the output terminals providing a first signal when the first and second resistance devices detect the same refrigerant phase, and a second signal when the first and second resistance devices detect different refrigerant phases. The controller controls a predetermined parameter of the refrigeration system in response to the first and second signals, to cause the change from the first refrigerant phase to the second refrigerant phase to occur substantially at the location of the second resistance device.

11 Claims, 1 Drawing Sheet

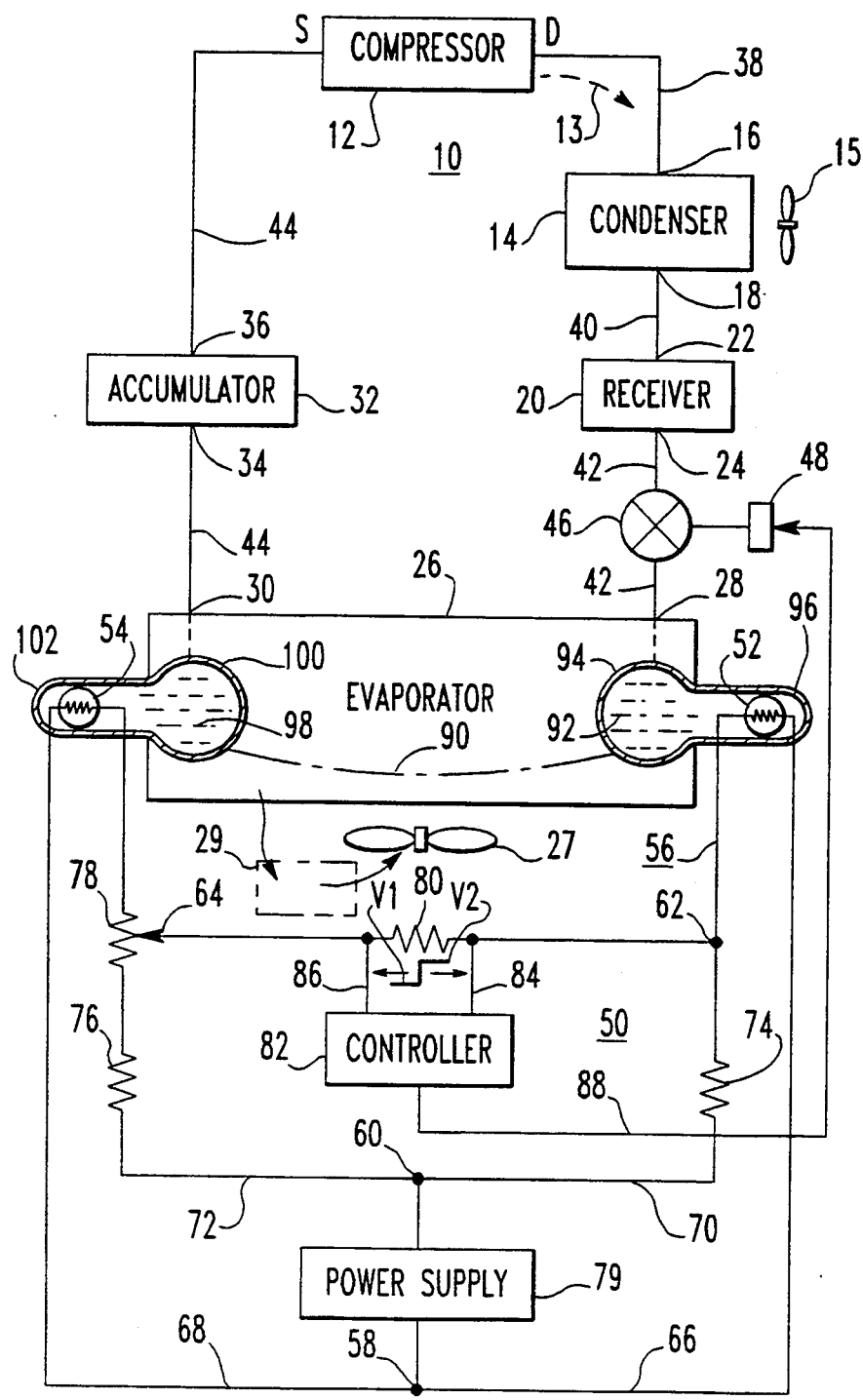

PHASE CHANGE LOCATION CONTROLLER FOR A HEAT EXCHANGER IN A REFRIGERATION SYSTEM

TECHNICAL FIELD

The invention relates in general to refrigeration systems, and more specifically to methods and apparatus for controlling the location of a change in phase of a refrigerant in a heat exchanger of a refrigeration system.

BACKGROUND ART

It is conventional to control refrigerant flow through an evaporator coil of a refrigeration system with a thermostatic expansion valve which responds to temperature and pressure sensors in an attempt to efficiently evaporate refrigerant via heat removed from a served space. If the refrigerant evaporates too soon, heat transfer efficiency suffers and the refrigerant becomes superheated. Heat transfer occurs more efficiently into the portion of the evaporator coil where the inner coil surface is wetted by liquid refrigerant, and thus it is desirable that the phase change from liquid to vapor occurs as close as possible to the outlet end of the evaporator coil. If all of the refrigerant has not been evaporated, however, liquid refrigerant may be carried into a suction port of a refrigerant compressor, causing slugging and possible damage to the compressor.

It would thus be desirable, and it is an object of the present invention, to provide new and improved refrigeration apparatus and methods which control where a predetermined change in phase occurs in a heat exchanger coil of the refrigeration system, ie., from a liquid to a vapor state or from a vapor to a liquid state.

It would further be desirable, and it is another object of the present invention, to provide new and improved refrigeration apparatus and methods which control where the change in phase from a liquid to a vapor state occurs in an evaporator coil of a refrigeration system, to provide complete evaporation as close to the outlet of the evaporator coil as possible, to increase efficiency of heat transfer, limit superheat, and reduce the chance of liquid refrigerant being drawn into the refrigerant compressor. It would also be desirable to accomplish this phase change location control without requiring the use of a costly pressure transducer.

SUMMARY OF THE INVENTION

Briefly, the present invention is a refrigeration system, and method of operating same, with the refrigeration system having a refrigerant flow path which includes a heat exchanger having an inlet, an outlet, and a refrigerant flow path between the inlet and outlet. The refrigerant enters the inlet in a first predetermined phase and exits the outlet in a second predetermined phase. The apparatus includes a bridge circuit having bridge arms connected between input and output terminals, and first and second resistance means connected in predetermined different bridge arms of the bridge circuit. The first resistance means is disposed in heat exchange relation with the refrigerant in the flow path of the heat exchanger, adjacent to the inlet. The second resistance means is disposed in heat exchange relation with the refrigerant in the flow path of the heat exchanger, at a location between the inlet and outlet where the change in phase from the first phase to the second phase is desired. A source of potential is connected to the input terminals of the bridge circuit, with the output terminals of the bridge circuit providing a first signal when the first and second resistor means detect the same refrigerant phase, and a second signal when the first and second resistance means detect different refrigerant phases. Control means controls a predetermined parameter of the refrigeration system in response to the first and second signals, such that the change from the first refrigerant phase to the second refrigerant phase occurs substantially at the location of the second resistance means.

The method of the invention controls the location of a refrigerant phase change in a heat exchanger of a refrigeration system, and it includes the steps of providing first and second resistance means having predetermined temperature coefficients of resistance, disposing the first resistance means in heat exchange relation with the refrigerant in the flow path of the heat exchanger, adjacent to the inlet, disposing the second resistance means in heat exchange relation with the refrigerant in the flow path of the heat exchanger, at a location where the change in phase from the first phase to the second phase is desired, connecting the first and second resistance means in a bridge circuit which provides a first output signal when the first and second resistor means detect the same refrigerant phase, and a second output signal when the first and second resistance means detect different refrigerant phases, and controlling a predetermined parameter of the refrigeration system in response to the first and second signals, such that the change from the first refrigerant phase to the second refrigerant phase occurs substantially at the location of the second resistor means.

BRIEF DESCRIPTION OF THE DRAWINGS

The invention will become more apparent by reading the following detailed description in conjunction with the drawings, which are shown by way of example only, wherein the single figure is a partially schematic and partially block diagram of a refrigeration system constructed according to the teachings of the invention wherein the location of a phase change from a liquid to a vapor is controlled in a refrigerant evaporator.

DESCRIPTION OF PREFERRED EMBODIMENTS

The present invention applies in general to any type of refrigeration system where a change in phase of a heat transfer medium occurs, such as in a vapor compression system which uses a refrigerant in the form a fluorocarbon or a chlorofluorocarbon, and in a cryogenic system which uses a refrigerant in the form of liquid carbon dioxide, liquid nitrogen, and the like. For purposes of example, a vapor compression system will be described.

Referring now to the single Figure, there is shown a refrigeration system 10 comprising a refrigerant compressor 12 having discharge and suction ports D and S, respectively, connected in a refrigerant flow path 13 which includes a refrigerant condenser coil 14 having an inlet 16 and an outlet 18, a refrigerant receiver 20 having an inlet 22 and an outlet 24, a refrigerant evaporator 26 having an inlet 28 and an outlet 30, and an optional accumulator 32 having an inlet 34 and an outlet 36. The discharge port D of compressor 12 is connected to the inlet 16 of condenser coil 14 via a hot gas line 38, with a coolant, such as ambient air, being forced to flow in heat exchange relation with condenser coil 16, such as via a condenser fan or blower 15. The outlet 18 of condenser coil 14 is connected to the inlet 22 of receiver 20 via a conduit 40. The outlet 24 of receiver 20 is connected to the inlet 28 of evaporator coil 26 via a liquid line 42, with an evaporator fan or blower 27 drawing air from a conditioned space 29, and forcing air conditioned by evaporator coil 26 into conditioned space 29. the outlet 30 of evaporator coil 26 is connected to the suction port S of compressor 12 via a suction line 44, with the accumulator 36, if used, being disposed in the suction line 44.

An expansion device 46 having a controllable orifice is disposed in liquid line 42. Expansion device 46, instead of being a thermostatic expansion device controlled by the temperature and pressure of the refrigerant at the outlet 30 of evaporator coil 26, is of the type in which the orifice is controlled electrically, such as by a stepper motor 48.

Phase change location control apparatus 50 constructed according to the teachings of the invention includes first and second resistance means 52 and 54, respectively, which have like temperature coefficients of resistance which vary with temperature. In a preferred embodiment, the first and second resistance means 52 and 54 are thermistor devices having matched characteristics, i.e., devices which have high, nonlinear, negative coefficients of resistance.

Resistance means 52 and 54 are connected in predetermined different arms of a resistive bridge circuit 56 which has first and second input terminals 58 and 60, respectively, and first and second output terminals 62 and 64, respectively. Bridge circuit 56 has first and second bridge arms 66 and 68 connected from input terminal 58 to output terminals 62 and 64, respectively, and third and fourth bridge arms 70 and 72 connected from input terminal 60 to output terminals 62 and 64, respectively. The first and second resistance means 52 and 54 are respectively connected in the first and second bridge arms 66 and 68. Current limiting resistors 74 and 76 of like ohmic value are connected in the third and fourth bridge arms 70 and 72, respectively.

The first output terminal 62 is at the junction of the first and third bridge arms 66 and 70, and the second output terminal 64 is at the junction of the second and fourth bridge arms 68 and 72, respectively. Instead of output terminal 64 being a fixed terminal, it may be a movable arm of an optional adjustable resistor 78 used to balance bridge circuit 56.

A source 79 of electrical potential, AC or DC, such as 12 volts DC, is connected to the input terminals 58 and 60.

An output signal or voltage "V" is developed across the output terminals 62 and 64, such as by connecting impedance means 80, such as a high impedance resistor, across output terminals 62 and 64. The voltage across impedance means 80 is applied to input terminals of a controller 82 via conductors 84 and 86. Controller 82 provides an output signal via a conductor 88, which signal controls stepper motor 48, to adjust the size of the orifice of expansion device 46.

Evaporator coil 26 has a refrigerant flow path 90 between inlet 28 and outlet 30. The first resistance means 52 is disposed in heat transfer relation with refrigerant 92 in flow path 90 at a point which is at, or relatively close to, inlet 28. The conduit which defines flow path 90 at the point where the first resistance means 52 is located is preferably provided with a side well, with the conduit being indicated at 94 and a lateral or side well being indicated at 96. The well 96 insures that heat transfer between refrigerant 92 and resistance means 52 will be primarily responsive to the phase of refrigerant 92, and not its velocity. Placing well 96 at a lateral location will prevent well 96 from harboring compressor lubricant, which would deleteriously affect heat transfer.

The second resistance means 54 is disposed in heat transfer relationship with refrigerant 98 flowing in flow path 90, and is located at the general location in flow path 90 where it is desired that the change in phase from liquid to vapor occurs. Thus, the second resistance means 54 is located relatively close to outlet 30 of evaporator coil 26, as the most efficient heat transfer from the served space to the refrigerant in the evaporator coil 26 takes place when the refrigerant is in the liquid state. In like manner to the arrangement described for mounting the first resistance means 52, the conduit of flow path 90 at the point where the second resistance means 54 is located is also preferably provided with a side well, with the conduit being indicated at 100 and a lateral or side well being indicated at 102.

When the first and second resistance means 52 and 54 are disposed in refrigerant 92 and 98, respectively, having the same phase, the heat transfer characteristics will be similar and the first and second resistance means 52 and 54 will have similar electrical resistances. Bridge 56 may thus be balanced such that the voltage at output terminal 62 is substantially the same as the voltage at output terminal 64, providing a zero or minimal voltage across impedance means 80, and a first input signal V1 into controller 82 having a substantially zero level.

When the first and second resistance means 52 and 54 are disposed in refrigerant 92 and 98, respectively, of different phases, the heat transfer characteristics will be markedly different and the first and second resistance means 52 and 54 will have markedly different electrical resistances. This will provide a voltage at output terminal 62 which is different than the voltage at output terminal 64, providing a significant voltage across impedance means 80, and thus a second input signal V2 for controller 82 of significant magnitude.

This characteristic is utilized to control the location of the phase change of the refrigerant from liquid to vapor in evaporator coil 26. When a low value or first signal is being provided, indicating that the refrigerant 92 and 98 is primarily liquid in both wells 96 and 102, controller 82 will "step" stepper motor 48 in a first direction which reduces the area of the orifice in expansion device 46. This will move the phase change location back towards inlet 28. When refrigerant 98 in well 102 changes from liquid to vapor, a high value or second signal will be provided. Controller 82 will then "step" stepper motor 48 in a second direction, i.e., opposite to the first direction, to increase the area of the orifice in expansion device 46. This will move the phase change location towards outlet 30. Thus, controller 82 and stepper motor 48 will continually adjust the size of the orifice in expansion device 46 to provide that rate of refrigerant flow which will cause the change in phase from liquid refrigerant to vaporized refrigerant to occur in the immediate vicinity of the second resistance means 54.

While the invention has been disclosed relatively to causing refrigerant to change from a liquid to a vapor at a controlled location of a heat exchanger, it will be understood that the invention may also be used to control the point where refrigerant initially in the vapor state condenses back to the liquid state. This latter application of the invention would be similar to the application shown in the single Figure, except resistance means 52 and 54 would be disposed in heat exchange relation with predetermined locations of condenser coil 14, instead of evaporator coil 26, and the output 88 of controller 82 would be connected to control a predetermined parameter of the refrigeration system which is associated with condenser coil 14, such as the condenser fan 15.

I claim:

1. A refrigeration system having a refrigerant, a flow path for the refrigerant which includes a heat exchanger having an inlet, an outlet, and a refrigerant flow path between the inlet and outlet, with the refrigerant entering the inlet in a first predetermined phase and exiting the outlet in a second predetermined phase, comprising:
   a bridge circuit having bridge arms connected between first and second input and first and second output terminals,
   first and second resistance means connected in predetermined different bridge arms of said bridge circuit,
   first and second means in the refrigerant flow path of the heat exchanger respectively defining first and second locations for mounting said first and second resistance means in the refrigerant flow path while assuring that heat transfer between the refrigerant and the first and second resistance means will be primarily due to the phase of the refrigerant and not the velocity of the refrigerant,
   said first means being disposed adjacent to the inlet of the heat exchanger,
   said second means being disposed where a change in phase of the refrigerant from the first phase to the second phase is desired in the heat exchanger,
   said first resistance means being immersed in the refrigerant at the predetermined location of the refrigerant flow path provided by the first means,
   said second resistance means being immersed in the refrigerant at the predetermined location of the refrigerant flow path provided by the second means,
   a source of potential connected to the input terminals of said bridge circuit,
   the output terminals of said bridge circuit providing a first signal when said first and second resistor means detect the same refrigerant phase, and a second signal when said first and second resistance means detect different refrigerant phases,
   and control means controlling a predetermined parameter of the refrigeration system in response to said first and second signals, such that the change from the first refrigerant phase to the second refrigerant phase occurs substantially at the location of the second resistance means.

2. The refrigeration system of claim 1 wherein the first and second resistance means are thermistors having substantially matched temperature coefficients of resistance, with said first and second resistance means being located in bridge arms which are connected to the same predetermined one of the first and second input terminals.

3. The refrigeration system of claim 1 wherein the heat exchanger is an evaporator, the first and second predetermined refrigerant phases are liquid and vapor, respectively, and the second means is located to place the second resistor means closer to the outlet of the heat exchanger than to the inlet of the heat exchanger.

4. The refrigeration system of claim 1 wherein the heat exchanger is an evaporator, the first and second predetermined refrigerant phases are liquid and vapor, respectively, and the predetermined refrigerant parameter controlled by the control means is the rate of refrigerant flow through the heat exchanger.

5. The refrigeration system of claim 4 wherein the control means includes an expansion valve having a controllable orifice, and a stepper motor which controls the orifice in response to the first and second signals.

6. The refrigeration system of claim 1 wherein the heat exchanger is a condenser, and the first and second predetermined refrigerant phases are vapor and liquid, respectively.

7. A method of controlling the location of a refrigerant phase change in a heat exchanger of a refrigeration system, with the heat exchanger having an inlet, an outlet, and a refrigerant flow path between the inlet and outlet, and with the refrigerant entering the inlet in a first predetermined phase and exiting the outlet in a second predetermined phase, comprising the steps of:
   providing first and second resistance means having predetermined temperature coefficients of resistance,
   providing first and second predetermined locations in the refrigerant flow path of the heat exchanger for mounting the first and second resistance means in the refrigerant flow path while assuring that heat transfer between the refrigerant and the first and second resistor means will be primarily due to the phase of the refrigerant and not to the velocity of the refrigerant,
   selecting the first predetermined location in the refrigerant flow path such that it is near the inlet of the heat exchanger,
   selecting the second predetermined location in the refrigerant flow path such that it is where a change in phase of the refrigerant between the first and second phases is desired,
   immersing said first resistance means in the refrigerant at the first predetermined location in the flow path of the heat exchanger,
   immersing said second resistance means in the refrigerant at the second predetermined location in the flow path of the heat exchanger,
   connecting said first and second resistance means in a circuit which provides a first output signal when said first and second resistor means detect the same refrigerant phase, and a second output signal when said first and second resistance means detect different refrigerant phases,
   and controlling a predetermined parameter of the refrigeration system in response to said first and second signals, such that the change from the first refrigerant phase to the second refrigerant phase occurs substantially at the location of the second resistor means.

8. The method of claim 7 including the steps of:
   selecting the first and second resistor means to have substantially matched temperature coefficients of resistance,
   and connecting the first and second resistor means to a common input terminal.

9. The method of claim 7 wherein the heat exchanger is an evaporator, the first and second predetermined refrigerant phases are liquid and vapor, respectively, and wherein the step of selecting the second predetermined location places the second resistor means closer to the outlet of the heat exchanger than to the inlet of the heat exchanger.

10. The method of claim 7 wherein the heat exchanger is an evaporator, the first and second predetermined refrigerant phases are liquid and vapor, respectively, and wherein the step of controlling a predetermined refrigerant parameter includes the step of controlling the rate of refrigerant flow through the heat exchanger.

11. The method of claim 10 including the step of providing expansion means having a controllable orifice in the refrigerant flow path adjacent to the inlet of the heat exchanger, with the step of controlling the rate of refrigerant flow through the heat exchanger including the step of controlling the orifice size of the expansion means.

* * * * *